G. CROSBY.
ELECTRICAL SYSTEM OF DISTRIBUTION.
APPLICATION FILED OCT. 8, 1908.

1,078,721.

Patented Nov. 18, 1913.

2 SHEETS—SHEET 1.

Fig. 1

Witnesses:
W. A. Hutton
John O. Gumpler

Inventor
Gorham Crosby
By his Attorneys
Kenyon & Kenyon

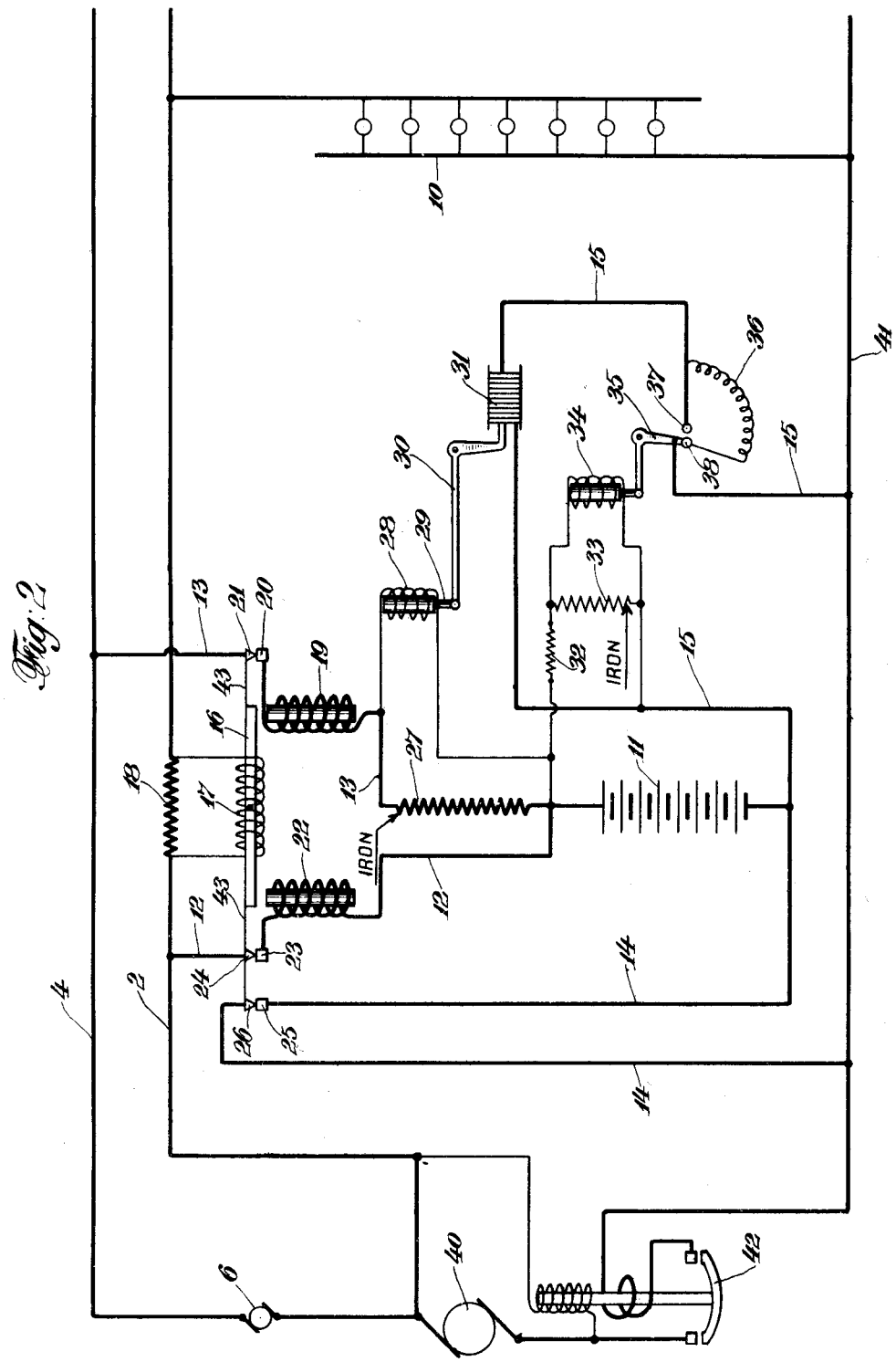

UNITED STATES PATENT OFFICE.

GORHAM CROSBY, OF NEW YORK, N. Y., ASSIGNOR TO GOULD COUPLER COMPANY, A CORPORATION OF NEW YORK.

ELECTRICAL SYSTEM OF DISTRIBUTION.

1,078,721. Specification of Letters Patent. Patented Nov. 18, 1913.

Application filed October 8, 1908. Serial No. 456,757.

*To all whom it may concern:*

Be it known that I, GORHAM CROSBY, a citizen of the United States, and a resident of New York city, county and State of New York, have invented certain new and useful Improvements in Electrical Systems of Distribution, of which the following is a specification.

My invention relates to electrical systems of distribution and more especially to systems in which a storage battery is used and in which the battery is designed to be charged from the same primary source, which feeds the translating devices and in which the battery is designed to feed the translating devices when said primary source is inoperative. In such systems if the normal voltage of the primary source be applied to the battery when its voltage is low an undue amount of charging current will flow into the battery which is liable to cause damage thereto. Also if after the battery has reached its proper state of charge, the full charging current be longer applied the battery may become damaged from over charging. To avoid these disadvantages I provide means for maintaining a substantially constant charging current during all periods of battery charging, and also provide means for materially cutting down the charging current when the battery has reached its proper state of charge.

Further objects of my invention are to provide extremely sensitive, accurate and efficient means for regulating and maintaining the battery charging current substantially constant and for producing the proper decrease in the charging current when the battery has become fully charged.

Other objects, advantages, and improvements will more clearly appear from the detailed description given below taken in connection with the accompanying drawings which form a part of this specification.

In the drawings Figure 1 represents diagrammatically one form of various of my improvements applied to a train lighting system in which a generator is placed on one unit of the train and batteries and lamps on various of the other units of the train. Fig. 2 shows diagrammatically one form of various of my improvements applied to an axle lighting system in which an independent generator is placed on various of the train units and is driven from the car axle.

Referring to Fig. 1, 1 represents a generator usually placed on one of the forward units of a train. 2, 2, represents a work circuit fed by the generator, 1 and extending through the various train units, the connections between train units being made by connectors 3, 3. 4, 4, represents a charging circuit fed by the generator and also extending through the various train units, the connections between units being made by connectors 5, 5. In the charging circuit and preferably arranged on the same unit with the generator is a booster 6 which maintains the potential of the charging circuit above that of the work circuit to provide a proper charging voltage for batteries on the various units. 7, 7, represents a loop conductor extending through the various train units and arranged as a return conductor for the charging and work circuits. Connectors 8, 8 are provided between units in this conductor and a connector 9 forms the loop. This conductor is made in the form of a loop in order to maintain the voltages at the various units the same.

In Fig. 1, I represent two units of a train which are provided with batteries and lamps. These units are designated A and B and a description of one will suffice for the other since both units are equipped in the same manner. In said units a lamp or other translating circuit 10 is shown connected directly across the work circuit 2. 11 represents the storage battery which is provided with a circuit 12 for connecting one of its terminals to the work circuit 2 and a circuit 13 for connecting the same terminal with the charging circuit 4. The other terminal of the battery is connected to the loop conductor 7 by means of two parallel circuits, one a short circuit 14 and the other a circuit 15. 16 represents a pivoted magnetizable member of a switch, said magnetizable member being polarized by a coil 17 in shunt with a small resistance 18 in the work circuit 2, 2. One pole or end of the member 16 has operating upon it a coil or solenoid 19 which is in series in the circuit 13. The solenoid 19 is arranged to attract the member 16 when the battery is receiving a charging current and thus maintain the contact points 20 and 21 together to keep the circuit 13 closed. The other pole or end of the polarized member 16 of the switch is arranged to be acted upon or controlled by a coil or solenoid 22 in series in the circuit 12, and which attracts said member when the battery is delivering current to the work circuit 2, and maintains the contacts 23 and 24 together to keep the circuit 12 closed. At the same time the contact points 25 and 26 are brought together thus connecting the other terminal of the battery directly to the conductor 7 through the short circuit 14.

In series with the battery and in the cirsuit 13 is a resistance 27 which has the property or characteristic that when certain increases of current occur therein its resistance increases to a very great and marked degree. For this purpose I prefer the use of an iron resistance which is found to possess these properties to a marked degree. When the conductor 27 reaches a certain temperature produced by a certain current therein its resistance increases very rapidly with further increase of current therein. The resistance is so designed that the normal charging current desired lies within this critical range. The conductor 27 in order to have sufficient conductivity may be made of one solid thick piece, or of a bundle of small wires in parallel or bunched together. Across the terminals of the conductor or resistance 27, is connected a coil or solenoid 28 which has a core 29 arranged to act upon the lever 30 to compress or release the blocks of a carbon pile 31. The carbon pile or variable resistance 31 is arranged in series with the battery in the circuit 15 so as to vary the strength of the current flowing into the battery. Across the terminals of the battery are connected two resistances 32 and 33 which are in series with each other, the resistance 32 being any ordinary ohmic resistance while the resistance 33 has the same properties as the resistance 27 with the exception that the resistance or conductor 33 is designed to carry only a very small current. Across the terminals of the resistance 33 and in parallel therewith I connect a coil or solenoid 34, operating or acting upon a lever 35 which is arranged to throw a large resistance 36 in and out of the circuit 15 by means of contact points 37 and 38.

In operation, when the contact points 20 and 21 are connected together and the battery is not fully charged, current from the charging circuit 4 flows through circuit 13, coil 19, conductor 27, battery 11, to charge the same, conductor 15, lever 35, contact point 37, carbon pile or rheostatic device 31 to the opposite side of the generator 1, through conductor 7. As this charging current tends to decrease, due to the increase in voltage of the battery, the resistance of the conductor 27 materially decreases thus reducing the voltage across its terminals. This materially reduces the current in the solenoid 28 so that gravity operates upon the lever 30 to compress the blocks of the carbon pile 31 thus decreasing the resistance in series with the battery to bring the battery current substantially back to its normal value. If for any reason an increase of current should take place in the battery and circuit 13 the opposite operations would take place and the carbon blocks of the pile 31 would be relieved of pressure so that more resistance would be inserted in the battery circuit to bring the current substantially back to its normal value. The resistance 33 is so designed that when the battery has become fully charged as indicated by the voltage across its terminals, this voltage will cause a current to flow through it which will produce the marked rise in its resistance, above pointed out and explained. This causes a great increase in current in the coil 34 which operates the lever 35 to throw the large resistance 36 in series with the battery so that the charging current is materially cut down or substantially wiped out. If for any reason the voltage of the generator, 1, should decrease below a predetermined value or the generator should be disconnected, the battery will supply or tend to supply current to the circuit 4. Thus a reverse current will circulate in the coil 19 which will repulse the member 16, opening the circuit 13 bringing together the contacts 23 and 24 and 25 and 26, and connecting the battery directly across the work circuit 2 through the circuits 12 and 14. Thus the coil 19 and the conductor 27 are eliminated as current carrying devices and the circuit 14 short circuits all the apparatus arranged in the circuit 15. The battery will now furnish current to the work circuit 2 and lamps 10 and the coarse wire coil 22 will operate to attract the member 16 to maintain the contacts 23 and 24 and 25 and 26 together to keep the circuits 12 and 14 closed. In case it should happen in switching the battery 11 from the charging circuit 4 to the work circuit 2, or vice versa, that the member 16 should stop in such a position that neither of the circuits 12 or 13 would be closed, both of the coils 19 and 22 would remain deënergized. To prevent this I overbalance the member 16 which is pivoted, by adding a weight 39, which insures, that in such case, the member 16 will move toward the coil 22 thus closing the circuit 12. The system will then operate as above pointed out.

Referring to Fig. 2, I show various of my improvements applied to an axle lighting system, in which each unit is provided with a generator, driven from the axle, lamps, battery, and regulating apparatus. 40 represents a generator which may be driven from the car axle, and which supplies a work circuit 2 and a charging circuit 4, the charging circuit 4 being provided with the booster 6 as before, and the generator 40 being designed by any well known means to produce a substantially constant potential throughout certain variations in speed. A conductor 41 serves as a return conductor for the work and charging circuits. 42 represents a common voltage switch which is operated upon by a current coil to open the switch when a reverse current passes from the battery to the generator. In general the remaining parts shown in Fig. 2 are constructed and operated substantially the same as the corresponding parts shown in Fig. 1. The contact points 21, 24 and 26 are shown arranged on spring pieces 43 and so that when the member 16 is switching the battery from the charging circuit to the work circuit, or vice versa, one set of contacts will make contact before the other set of contacts break contact. This prevents any flicker in the lamps when the switching occurs, which in this system would happen every time the train stopped or reduced its speed below a predetermined point. This feature is also embodied in the system shown in Fig. 1 as clearly shown in the drawing.

From the above it will be clear that I have provided improvements which materially overcome the disadvantages above pointed out and which conduce to the provision of a system of the class described which is sensitive, accurate and efficient and which is economical of construction and operation.

Although I have described my improvements with great detail, I do not desire to be limited to such details, but, Having thus fully and clearly described my invention what I claim and desire to secure by Letters Patent, is:

1. The combination of a generator, a circuit fed thereby, a battery connected across said circuit, a resistance in series with said battery, said resistance being markedly variable with certain current changes therein, and means responsive to current changes in said resistance for regulating the battery current.

2. The combination of a generator, a circuit fed thereby, a battery connected across said circuit, a resistance arranged to carry a current responsive to changes in the battery current, said resistance being markedly variable with certain current changes therein, and means responsive to variations in the electrical condition of said resistance for varying the battery current.

3. The combination of a circuit, a battery connected across said circuit, a conductor arranged to carry a current responsive to changes in the battery current, said conductor having a resistance which is markedly variable with certain current changes therein, and means responsive to voltage changes across said conductor for regulating the battery current.

4. The combination of a circuit, a battery connected across said circuit, a conductor in series with said battery, said conductor having a resistance which is markedly variable with certain changes of current therein, and means responsive to changes in the electrical condition of said conductor for varying the battery current.

5. The combination of a generator, a circuit fed thereby, a battery connected across said circuit, an iron resistance arranged to carry a current responsive to changes in the battery current, and means responsive to voltage changes across said resistance for varying the battery current.

6. The combination of a generator, a circuit fed thereby, a battery connected across said circuit, a conductor arranged to carry a current responsive to changes in the battery current, said conductor being markedly variable in its resistance with certain changes of current therein, a rheostatic device for varying the battery current and means for operating said rheostatic device responsive to variations in the electrical condition of said conductor.

7. The combination of a generator, a circuit fed thereby, a battery connected across said circuit, an iron resistance arranged to carry a current responsive to changes in the battery current, a rheostatic device for varying the battery current, and a coil for operating said rheostatic device responsive to variations in the electrical condition of said resistance.

8. The combination of a circuit, a battery connected across said circuit, an iron resistance in series with the battery, a variable resistance in series with the battery and mechanical means for varying the variable resistance responsive to voltage changes across said iron resistance.

9. The combination of a generator, a circuit fed thereby, a battery connected across said circuit, a conductor in series with the battery, said conductor having a resistance markedly variable with certain changes of current therein, a solenoid responsive to voltage changes across said resistance, a rheostatic device in series with the battery for varying the battery current and mechanical means operated by said solenoid for operating said rheostatic device.

10. The combination of a circuit, a battery connected across said circuit, a conductor arranged to carry a current responsive to changes in the battery current, said conductor having a resistance which is markedly variable with changes of current therein, a carbon pile in series with the battery and means for controlling said pile responsive to changes in the electrical condition of said conductor.

11. The combination of a generator, a circuit fed thereby, a battery connected across said circuit, an iron resistance in series with the battery, a carbon pile in series with the battery, a solenoid responsive to voltage changes across said iron resistance, and mechanical means for operating said carbon pile from said solenoid to vary the battery current responsive to voltage changes across said iron resistance.

12. The combination of a generator, a circuit fed thereby, a battery arranged to be charged from said circuit, a conductor connected to be subject to voltage changes across the battery, said conductor having a resistance which markedly varies with changes of current therein, and means for inserting a resistance in the battery circuit to decrease the battery charging current responsive to changes in the electrical condition of said conductor.

13. The combination of a circuit, a battery arranged to be charged from said circuit, two resistances connected across said battery, one of said resistances being of iron wire, a solenoid connected to said iron resistance and responsive to voltage changes therein, and a resistance connected and arranged to be placed in series with the battery by said solenoid, to decrease the charging current, responsive to certain changes in the electrical condition of the battery.

14. The combination of a generator, a work circuit and a charging circuit fed thereby simultaneously, a storage battery in operative relation thereto, a switch arranged to connect the battery with either of said circuits, regulating devices arranged to be in series with the battery when connected with the charging circuit and means for cutting the said regulating devices out of circuit with the battery when the battery feeds the work circuit.

15. The combination of a work circuit and a charging circuit simultaneously supplying different potentials, a storage battery in operative relation thereto, a switch arranged to connect the battery with either of said circuits, regulating apparatus arranged in series with the battery when connected to the charging circuit and means for short-circuiting said apparatus when the battery is connected to the work circuit.

16. The combination of a work circuit and a charging circuit, a storage battery in operative relation thereto, a polarized switch arranged to connect the battery with either of said circuits, a regulating device and a rheostatic device connected in series with the battery when the battery is connected to the charging circuit, and means for short-circuiting said devices when the battery is connected to the work circuit.

17. The combination of a work circuit and a charging circuit simultaneously supplying different potentials, a storage battery in operative relation thereto, and a switch, said switch being provided with an electromagnet to connect the battery to the charging circuit and with an electro-magnet to connect the battery to the work circuit.

18. The combination of a work circuit and a charging circuit simultaneously supplying different potentials, a storage battery in operative relation thereto, and a switch, said switch being provided with a solenoid to connect the battery with the charging circuit, with a solenoid to connect the battery to the work circuit and with means for polarizing said switch.

19. The combination of a generator, a work circuit and a charging circuit fed thereby simultaneously, a storage battery in operative relation thereto, and a switch, said switch being provided with a solenoid for connecting the battery to the work circuit and a solenoid for connecting the battery to the charging circuit.

20. The combination of a generator, a work circuit and a charging circuit fed thereby simultaneously, a storage battery in operative relation thereto, a plurality of contact points, magnetizable means for operating said contact points, a coil in series with the battery for operating said means to connect the battery to the work circuit and a coil in series with the battery for operating said means to connect the battery across the charging circuit.

21. The combination of a generator, a work circuit and a charging circuit fed thereby, a storage battery in operative relation thereto, contact points for connecting the battery to the charging circuit, a rheostatic device in series with the battery to regulate the battery current, contact points for connecting the battery to the work circuit, a magnetizable member for controlling the contact points, means for polarizing said member, a coil in series with the battery operating upon said member to connect the battery to the charging circuit, a regulating device in series with said coil, a coil in series with the battery for operating upon said member to connect the battery directly to the work circuit, and contact points arranged to short-circuit said rheostatic device when the battery is connected to the work circuit.

22. The combination of a work circuit and a charging circuit simultaneously supplying different potentials, a storage battery in operative relation thereto, contact points for connecting the battery to either of said circuits, a coil for operating said contact points to connect the battery to the charging circuit, a current regulating device in series with said coil, and a coil arranged to operate said contact points to connect the battery to the work circuit and at the same time short circuit said regulating device.

23. The combination of a generator, a work circuit and a charging circuit fed thereby, a storage battery in operative relation thereto, means for connecting the battery across either of said circuits and means for maintaining the battery connected across one of said circuits until the battery has been connected across the other of said circuits.

24. The combination of a plurality of train units, a generator on one unit, a charging circuit fed thereby, running through various train units, a battery on various train units connected to be charged from said circuit and independent means for regulating the charging current of each battery independently of the condition of charge of the various batteries, said means embracing a resistance which markedly varies with certain changes of current therein.

25. The combination of a plurality of train units, a generator on one unit, a charging circuit fed thereby, running through various train units, a battery on various train units, connected to be charged from said circuit and independent means for regulating the charging current of each battery, said means embracing an iron resistance and a carbon pile in series with the battery.

26. The combination of a plurality of train units, a generator on one unit, a circuit fed thereby extending through various train units, a battery on each of various train units arranged to be charged from said circuit and independent means for cutting down the charging current of each battery at a predetermined point, said means embracing a conductor which has a resistance markedly varying with certain changes of current therein.

27. The combination of a plurality of train units, a generator on one unit, a charging circuit fed thereby running through various train units, a battery on various train units, connected to be charged from said circuit and independent means for regulating the charging current of each battery, translating devices on various train units, a work circuit fed by said generator and connected to said translating devices, and independent switches for connecting each battery either to said work circuit or said charging circuit, each switch being provided with two coils, one connected to receive charging current and the other connected to receive work current.

28. The combination of a plurality of train units, a generator on one unit, a charging circuit fed thereby, running through various train units, a battery on various train units, connected to be charged from said circuit and independent means for regulating the charging current of each battery, translating devices on various train units, a work circuit fed by said generator and connected to said translating devices, and independent switches for connecting each battery either to said work circuit or said charging circuit and a conductor in series with the battery for regulating the charging current, said conductor having a resistance which varies markedly with certain changes of current therein.

29. The combination of a charging circuit, a storage battery arranged to be charged thereby, a compressible resistance rheostat in series with the battery, means for regulating said rheostat to maintain a substantially constant charging current and means for cutting down the charging current when the battery has become substantially charged.

30. The combination of a charging circuit, a storage battery arranged to be charged thereby, a carbon pile resistance in series with the battery, a coil responsive to battery current variations for regulating said resistance to maintain a substantially constant charging current, and means for suddenly and materially decreasing or eliminating the charging current when the battery has reached a predetermined voltage.

31. The combination of a main generator, a work circuit and storage battery arranged to be fed therefrom in parallel, a carbon pile rheostat regulated responsive to battery current variations for regulating the battery charging current, and means for suddenly decreasing the charging current when the battery has become substantially charged, said means embracing a coil responsive to battery voltage changes and operating to open or decrease the resistance of the battery circuit.

In testimony whereof, I have signed my name to this specification, in the presence of two subscribing witnesses.

GORHAM CROSBY.

Witnesses:
EDWIN SEGER,
JOHN O. GAMPLER.